(12) United States Patent
Jung et al.

(10) Patent No.: US 10,817,844 B2
(45) Date of Patent: Oct. 27, 2020

(54) METHOD FOR SHARING SCHEDULE AND ELECTRONIC DEVICE THEREOF

(71) Applicant: Samsung Electronics Co., Ltd., Suwon-si (KR)

(72) Inventors: Sung-Lyun Jung, Hwaseong-si (KR); Jeongsik Cho, Suwon-si (KR); Jee Hwan Park, Suwon-si (KR); Kyungshin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 163 days.

(21) Appl. No.: 15/814,730

(22) Filed: Nov. 16, 2017

(65) Prior Publication Data

US 2018/0137467 A1  May 17, 2018

(30) Foreign Application Priority Data

Nov. 16, 2016 (KR) .................. 10-2016-0152733

(51) Int. Cl.
| | |
|---|---|
| *G06F 15/173* | (2006.01) |
| *G06Q 10/10* | (2012.01) |
| *H04L 12/58* | (2006.01) |
| *G06F 3/0481* | (2013.01) |
| *H04L 29/08* | (2006.01) |

(52) U.S. Cl.
CPC ......... *G06Q 10/107* (2013.01); *G06F 3/0481* (2013.01); *G06Q 10/109* (2013.01); *H04L 51/14* (2013.01); *H04L 51/22* (2013.01); *H04L 51/04* (2013.01); *H04L 67/02* (2013.01)

(58) Field of Classification Search
CPC .................. H04L 29/08072; H04L 29/06
USPC ................. 709/206, 220, 224, 226, 228
See application file for complete search history.

(56) References Cited

U.S. PATENT DOCUMENTS

| | | | |
|---|---|---|---|
| 7,149,693 B2 * | 12/2006 | Laronne ................ | G06Q 10/00 704/270 |
| 8,024,411 B2 | 9/2011 | Pulfer et al. | |
| 8,196,047 B2 * | 6/2012 | Fisher ................... | G06F 11/324 715/734 |
| 8,284,917 B2 | 10/2012 | Wilson et al. | |
| 8,447,820 B1 * | 5/2013 | Gay ...................... | G06Q 10/10 709/206 |
| 8,645,181 B2 | 2/2014 | Lehmann et al. | |

(Continued)

FOREIGN PATENT DOCUMENTS

JP          5470183 B2    4/2014

*Primary Examiner* — Khanh Q Dinh

(57) ABSTRACT

Various exemplary embodiments of the present disclosure relate to an operating method and an electronic device for sharing schedules between a first electronic device and a second electronic device. The method includes, detecting, at the first electronic device, a user input in a schedule sharing menu displayed on an email application screen. The method also includes, displaying, at the first electronic device, a schedule sharing input region according to the user input. The method further includes, receiving, at the first electronic device, schedule information input in the schedule sharing input region. The method also includes, storing, at the first electronic device, the schedule information in a schedule management application and a transfer protocol header. The method also includes, transmitting, at the first electronic device, an email including the transfer protocol header to the second electronic device.

26 Claims, 14 Drawing Sheets

(56) References Cited

U.S. PATENT DOCUMENTS

| | | | | |
|---|---|---|---|---|
| 8,676,273 | B1* | 3/2014 | Fujisaki | H04M 1/6505 |
| | | | | 455/567 |
| 9,032,085 | B1* | 5/2015 | Khanna | H04L 67/22 |
| | | | | 705/51 |
| 9,720,555 | B2* | 8/2017 | Sorden | H04W 4/30 |
| 9,807,066 | B2* | 10/2017 | Aissi | G06F 21/60 |
| 9,900,423 | B2* | 2/2018 | He | H04W 8/22 |
| 2005/0028212 | A1* | 2/2005 | Laronne | G11B 27/102 |
| | | | | 725/86 |
| 2006/0200740 | A1* | 9/2006 | Kahn | G06Q 10/10 |
| | | | | 715/201 |
| 2007/0033051 | A1* | 2/2007 | Laronne | G06Q 10/00 |
| | | | | 704/270 |
| 2010/0146499 | A1 | 6/2010 | Bush et al. | |
| 2011/0295642 | A1* | 12/2011 | MacFarlane | G06Q 10/02 |
| | | | | 705/7.19 |
| 2012/0209816 | A1* | 8/2012 | Bank | G06F 11/1492 |
| | | | | 707/674 |
| 2013/0091452 | A1* | 4/2013 | Sorden | G01C 21/32 |
| | | | | 715/771 |
| 2014/0201270 | A1* | 7/2014 | Hansen | H04L 51/12 |
| | | | | 709/204 |
| 2015/0081806 | A1* | 3/2015 | Kanuturi | G06Q 10/1095 |
| | | | | 709/206 |
| 2015/0244724 | A1* | 8/2015 | Xu | G06F 21/6218 |
| | | | | 726/1 |
| 2015/0261624 | A1* | 9/2015 | Locasto | G06F 11/3672 |
| | | | | 714/19 |
| 2017/0063809 | A1* | 3/2017 | Aissi | G06F 21/60 |
| 2019/0073226 | A1* | 3/2019 | Mak | G06F 3/0488 |

\* cited by examiner

METHOD FOR SHARING SCHEDULE AND ELECTRONIC DEVICE THEREOF

CROSS-REFERENCE TO RELATED APPLICATIONS AND CLAIM OF PRIORITY

The present application is related to and claims priority under 35 U.S.C. § 119(a) to Korean Patent Application No. 10-2016-0152733 filed Nov. 16, 2016, the contents of which are herein incorporated by reference.

TECHNICAL FIELD

The present disclosure relates to a method for sharing a schedule and an electronic device supporting the same.

BACKGROUND

An electronic mail (email) can deliver a text with various files over a network. The email can be transmitted over the network using an email transfer protocol such as Simple Mail Transfer Protocol (SMTP), an email retrieval protocol such as Internet Messaging Access Protocol (IMAP) and Post Office Protocol (POP) 3, and a web mail using a web browser.

In recent, an Exchange ActiveSync (EAS) protocol can provide meeting information, memo information, task information, or contacts information stored in a mail box of a mail server, to a schedule management application and other application and thus synchronize an email application with the schedule management application and the other application.

To share a schedule with other users, a user who uses the email application conforming to the email retrieval protocol such as IMAP or POP3 needs to separately store the schedule in the schedule management application, which degrades user convenience. In addition, when the schedule is shared using the email application, the user has to input contents of the schedule in person because the email application does not provide a separate schedule sharing format.

SUMMARY

To address the above-discussed deficiencies, it is a primary object to provide a method for simply sharing a schedule even in an email application conforming to an email retrieval protocol such as Internet Messaging Access Protocol (IMAP) or Post Office Protocol (POP) 3, and an electronic device supporting the same.

According to one aspect of the present disclosure, an operating method between a first electronic device and a second electronic device can include detecting, at the first electronic device, a user input in a schedule sharing menu displayed on an email application screen, displaying, at the first electronic device, a schedule sharing input region according to the user input, receiving, at the first electronic device, schedule information input in the schedule sharing input region, storing, at the first electronic device, the schedule information in a schedule management application and a transfer protocol header, and sending, at the first electronic device, an email including the transfer protocol header to the second electronic device.

According to another aspect of the present disclosure, an operating method between a first electronic device and a second electronic device can include displaying, at the second electronic device, schedule information of an email received from the first electronic device, and a response menu on an email application screen, detecting, at the second electronic device, a user input in the response menu, displaying, at the second electronic device, a schedule sharing response region according to the user input, receiving, at the second electronic device, response information input in the schedule sharing response region, storing, at the second electronic device, the response information in a transfer protocol header, and sending, at the second electronic device, a response email including the transfer protocol header to the first electronic device.

According to another aspect of the present disclosure, an operating method between a first electronic device and a second electronic device can include receiving, at the first electronic device, a response email including a transfer protocol header from the second electronic device, parsing, at the first electronic device, a flag indicating any one of accept, hold, and reject of a schedule sharing request and Identification (ID) information in the transfer protocol header, and updating, at the first electronic device, status information of a schedule management application based on the parsed flag and ID information.

According to still another aspect of the present disclosure, a first electronic device can include a display functionally coupled to the first electronic device, and a processor, wherein the processor detects a user input in a schedule sharing menu displayed on an email application screen, displays a schedule sharing input region according to the user input, receives schedule information input in the schedule sharing input region, stores the schedule information in a schedule management application and a transfer protocol header, and sends an email including the transfer protocol header to the second electronic device.

According to a further aspect of the present disclosure, a second electronic device can include a display functionally coupled to the second electronic device, and a processor, wherein the processor displays schedule information of an email received from the first electronic device, and a response menu on an email application screen, detects a user input in the response menu, displays a schedule sharing response region according to the user input, receives response information input in the schedule sharing response region, stores the response information in a transfer protocol header, and sends a response email including the transfer protocol header to the first electronic device.

According to a further aspect of the present disclosure, a first electronic device can include a display functionally coupled to the first electronic device, and a processor, wherein the processor receives a response email including a transfer protocol header from the second electronic device, parses a flag indicating any one of accept, hold, and reject of a schedule sharing request, and Identification (ID) information in the transfer protocol header, and updates status information of a schedule management application based on the parsed flag and ID information.

Other aspects, advantages, and salient features of the disclosure will become apparent to those skilled in the art from the following detailed description, which, taken in conjunction with the annexed drawings, discloses exemplary embodiments of this disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1:
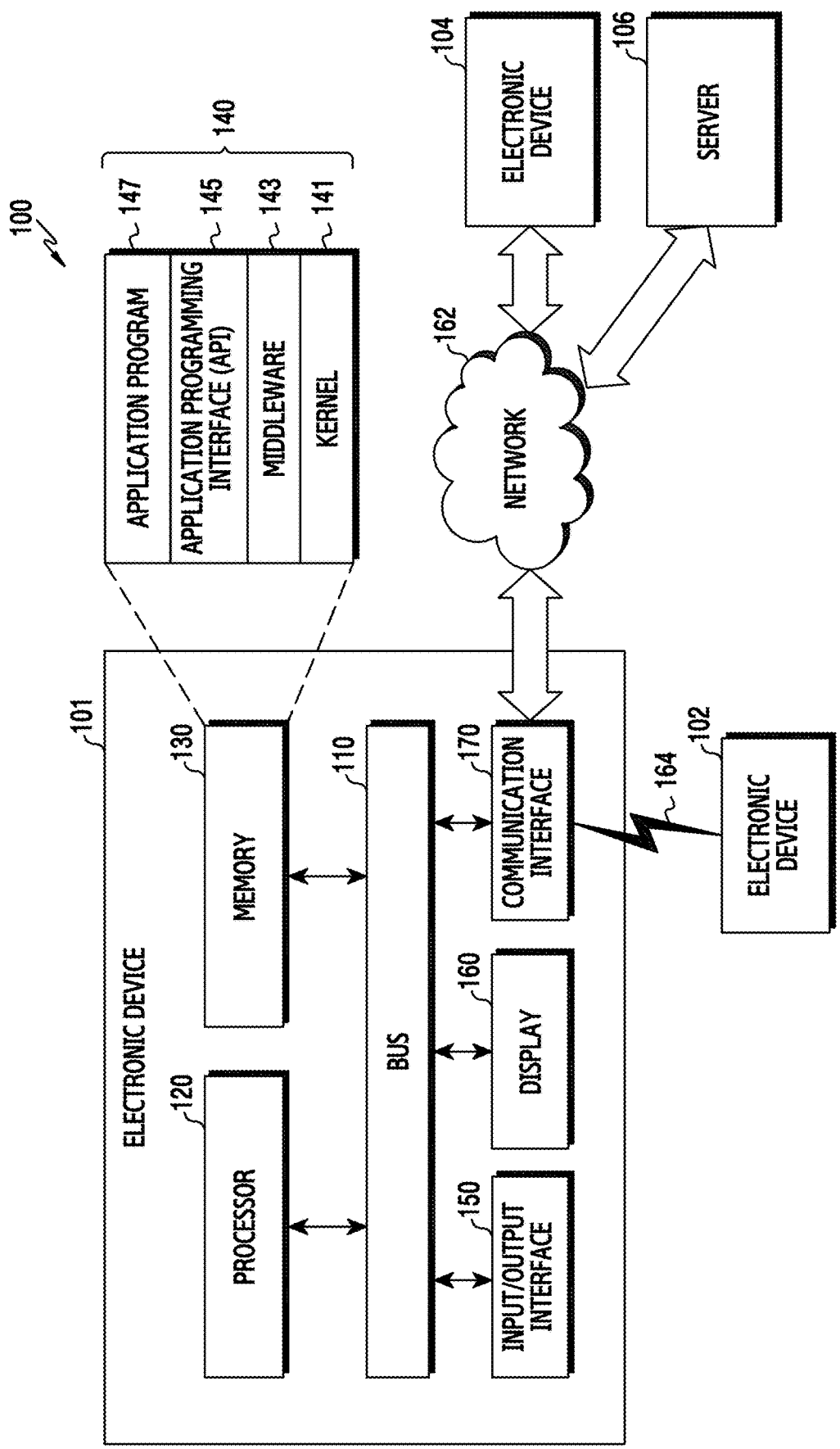
FIG. 1 illustrates a network environment including an electronic device according to various embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various example embodiments of the present disclosure will be described with reference to the accompanying drawings. However, it should be understood that there is no intent to limit the present disclosure to the particular forms disclosed herein; rather, the present disclosure should be understood to cover various modifications, equivalents, and/or alternatives of the various example embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), the element may be directly connected or coupled directly to the other element or any other element (e.g., third element) may be interposed between them. Additionally, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may refer, for example, to a situation in which the device, together with other devices or components, "is able to". For example, the phrase "processor adapted (or configured) to perform A, B, and C" may refer, for example, to a dedicated processor (e.g. embedded processor) for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even when the term is defined in the present disclosure, the term should not be interpreted to exclude embodiments of the present disclosure.

An electronic device according to various example embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various example embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some example embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HOMESYNC, APPLE TV, or GOOGLE TV), a game console (e.g., XBOX and PLAYSTATION), an electronic dictionary, an electronic key, a camcorder, and an electronic photo frame, or the like, but is not limited thereto.

According to another example embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some example embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various example embodiments of the present disclosure may be a combination of one or more of the aforementioned various devices. The electronic device according to some embodiments of the present disclosure may be a flexible device. Further, the electronic device according to an example embodiment of the present disclosure is not limited to the aforementioned devices, and may include a new electronic device according to the development of technology.

Hereinafter, an electronic device according to various example embodiments will be described with reference to the accompanying drawings. As used herein, the term "user" may indicate a person who uses an electronic device or a device (e.g., an artificial intelligence electronic device) that uses an electronic device.

FIG. 1 is a diagram illustrating an example network environment including an example electronic device according to various example embodiments of the present disclosure.

An electronic device 101 within a network environment 100, according to various embodiments, will be described with reference to FIG. 1. The electronic device 101 may include a bus 110, a processor (e.g., including processing circuitry) 120, a memory 130, an input/output interface (e.g., including interface circuitry) 150, a display 160, and a communication interface (e.g., including communication circuitry) 170. In some embodiments, the electronic device 101 may omit at least one of the above elements or may further include other elements.

The bus 110 may include, for example, a circuit for connecting the elements 110-170 and transferring communication (e.g., control messages and/or data) between the elements.

The processor 120 may include various processing circuitry, such as, for example, and without limitation, one or more of a dedicated processor, a Central Processing Unit (CPU), an Application Processor (AP), and a Communication Processor (CP). The processor 120, for example, may carry out operations or data processing relating to control and/or communication of at least one other element of the electronic device 101.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130)

used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more operation requests received from the application program 147 according to priority. For example, the middleware 143 may give priority to use the system resources of the electronic device 101 (for example, the bus 110, the processor 120, the memory 130, and the like) to at least one of the application programs 147. For example, the middleware 143 may perform scheduling or load balancing with respect to the one or more operation requests by processing the one or more operation requests according to the priority given to the at least one application program.

The API 145 is an interface through which the application programs 147 control functions provided from the kernel 141 or the middleware 143, and may include, for example, at least one interface or function (e.g., instruction) for file control, window control, image processing, or text control.

The input/output interface 150, for example, may include various interface circuitry and function as an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display, or the like, but is not limited thereto. The display 160, for example, may display various types of content (e.g., text, images, videos, icons, or symbols) for the user. The display 160 may include a touch screen and receive, for example, a touch, gesture, proximity, or hovering input using an electronic pen or the user's body part.

The communication interface 170, for example, may include various communication circuitry and set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. In addition, the wireless communication may include, for example, short-range communication 164. The short-range communication 164 may be performed by using at least one of, for example, Wi-Fi, Bluetooth, Bluetooth low energy (BLE), Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network such as a computer network (e.g., a LAN or a WAN), the Internet, and a telephone network.

Each of the first and second external electronic device 102 and 104 may be of a type identical to or different from that of the electronic device 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (e.g., the external electronic device 102 or 104 or the server 106). The electronic device 101 can perform the functions or services by itself or in addition to another device (e.g., the external electronic device 102 or 104 or the server 106). Another electronic apparatus may execute the requested functions or the additional functions, and may deliver a result of the execution to the electronic device 101. The electronic device 101 may process the received result or provide the requested functions or services. To achieve this, for example, cloud computing, distributed computing, or client-server computing technology may be used.

Figure 2:
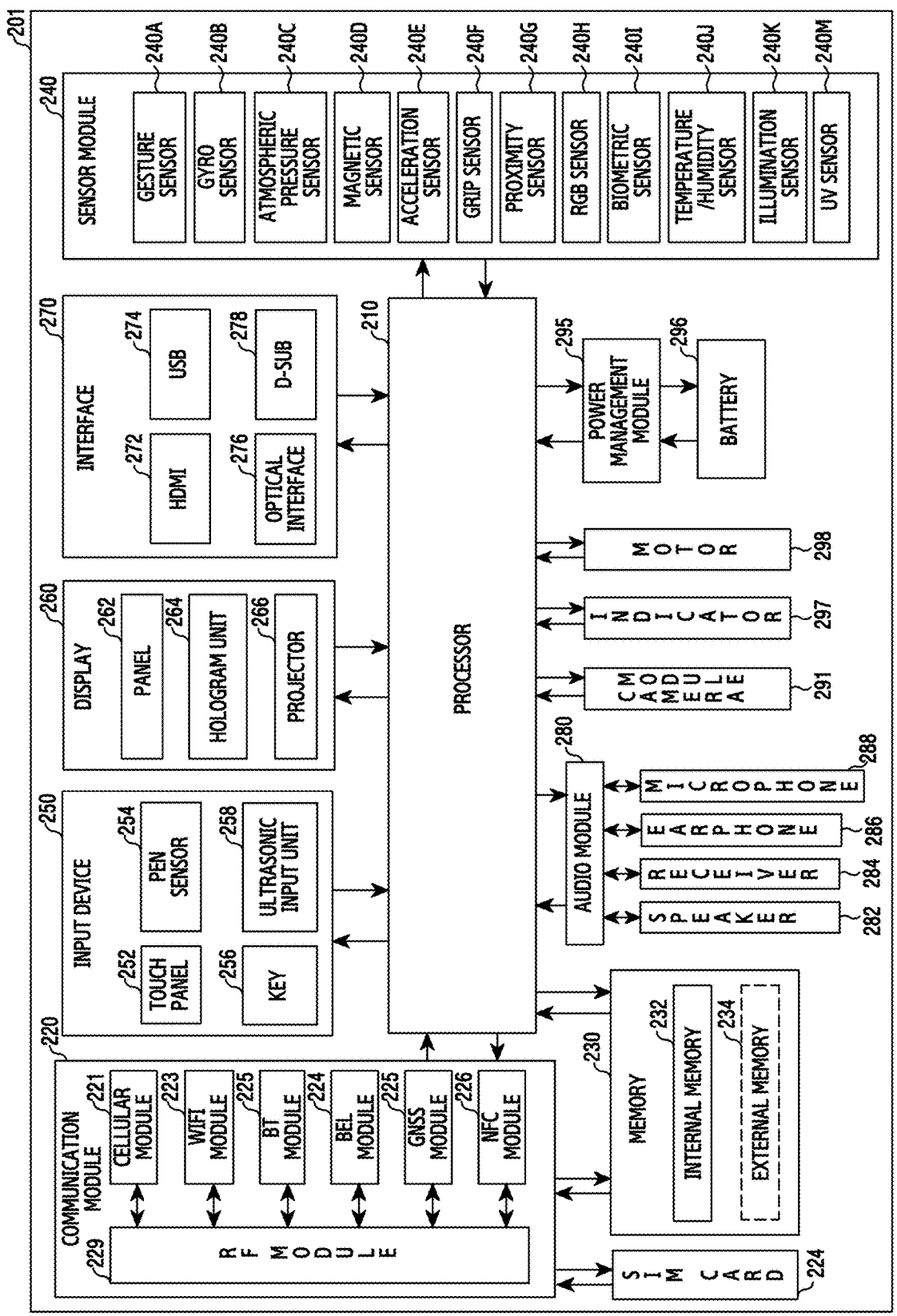
FIG. 2 illustrates a block diagram of an electronic device according to various embodiments of the present disclosure.

FIG. 2 is a block diagram illustrating an example electronic device according to various example embodiments of the present disclosure.

FIG. 2 is a block diagram of an electronic device 201 according to various example embodiments. For example, the electronic device 201 may include the whole or part of the electronic device 101 illustrated in FIG. 1. The electronic device 201 may include at least one processor (e.g., Application Processor (AP)) (e.g., including processing circuitry) 210, a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and control a plurality of hardware or software components connected to the processor 210 by driving an operating system or an application program and perform processing of various pieces of data and calculations. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration equal or similar to that of the communication interface 170 of FIG. 1. The communication module 220 may include various communication circuitry, such as, for example, and without limitation, the cellular module 221, a Wi-Fi module 223, a Bluetooth (BT) module 225, a GNSS module 227 (e.g., a GPS module, a Glonass module, a Beidou module, or a Galileo module), an NFC module 228, and a Radio Frequency (RF) module 229.

The cellular module 221 may provide a voice call, image call, a text message service, or an Internet service through, for example, a communication network. According to an embodiment, the cellular module 221 may distinguish between and authenticate electronic devices 201 within a communication network using a subscriber identification module (for example, the SIM card 224). According to an embodiment of the present disclosure, the cellular module 221 may perform at least some of the functions that the processor 210 may provide. According to an embodiment, the cellular module 221 may include a Communication Processor (CP).

Each of the Wi-Fi module 223, the BT module 225, the GNSS module 227, and the NFC module 228 may include, for example, a processor for processing data transmitted and received through the relevant module. According to some embodiments of the present disclosure, at least some (e.g., two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (for example, an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the Wi-Fi module 223, the BT module 225, the GNSS module 227, and the NFC module 228 may transmit and receive RF signals through a separate RF module.

The SIM 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (for example, the memory 130 of FIG. 1) may include, for example, an internal memory 232 and/or an external memory 234. The internal memory 232 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. For example, the sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (for example, a Red/Green/Blue (RGB) sensor), a biometric sensor 240I, a temperature/humidity sensor 240J, a light sensor 240K, and an Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments of the present disclosure, the electronic device 201 may further include a processor configured to control the sensor module 240 as a part of or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use at least one of, for example, a capacitive type, a resistive type, an infrared type, and an ultrasonic type. Also, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic wavers generated by an input tool through a microphone (for example, a microphone 288) and identify data corresponding to the detected ultrasonic waves.

The display 260 (for example, the display 160) may include a panel 262, a hologram unit 264 or a projector 266. The panel 262 may include a configuration that is identical or similar to the display 160 illustrated in FIG. 1. The panel 262 may be implemented to be, for example, flexible, transparent, or wearable. The panel 262 and the touch panel 252 may be implemented as one module. The hologram unit 264 may show a three dimensional image in the air by using an interference of light. The projector 266 may display an image by projecting light onto a screen. The screen may be located, for example, inside or outside the electronic device 201. According to an embodiment, the display 260 may further include a control circuit for controlling the panel 262, the hologram unit 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL)

interface, a Secure Digital (SD) card/Multi-Media Card (MMC) interface, or an Infrared Data Association (IrDA) standard interface.

The audio module 280 may bilaterally convert, for example, a sound and an electrical signal. At least some elements of the audio module 280 may be included in, for example, the input/output interface 150 illustrated in FIG. 1. The audio module 280 may process sound information which is input or output through, for example, a speaker 282, a receiver 284, earphones 286, the microphone 288 or the like.

The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 295 may manage, for example, power of the electronic device 201. According to an embodiment, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery or a solar battery.

The indicator 297 may display a particular state (e.g., a booting state, a message state, a charging state, or the like) of the electronic device 201 or a part (e.g., the processor 210). The motor 298 may convert an electrical signal into mechanical vibration, and may generate vibration, a haptic effect, or the like. Although not illustrated, the electronic device 201 may include a processing unit (e.g., a GPU) for supporting a mobile television (TV). The processing unit for supporting mobile TV may, for example, process media data according to a certain standard such as Digital Multimedia Broadcasting (DMB), Digital Video Broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
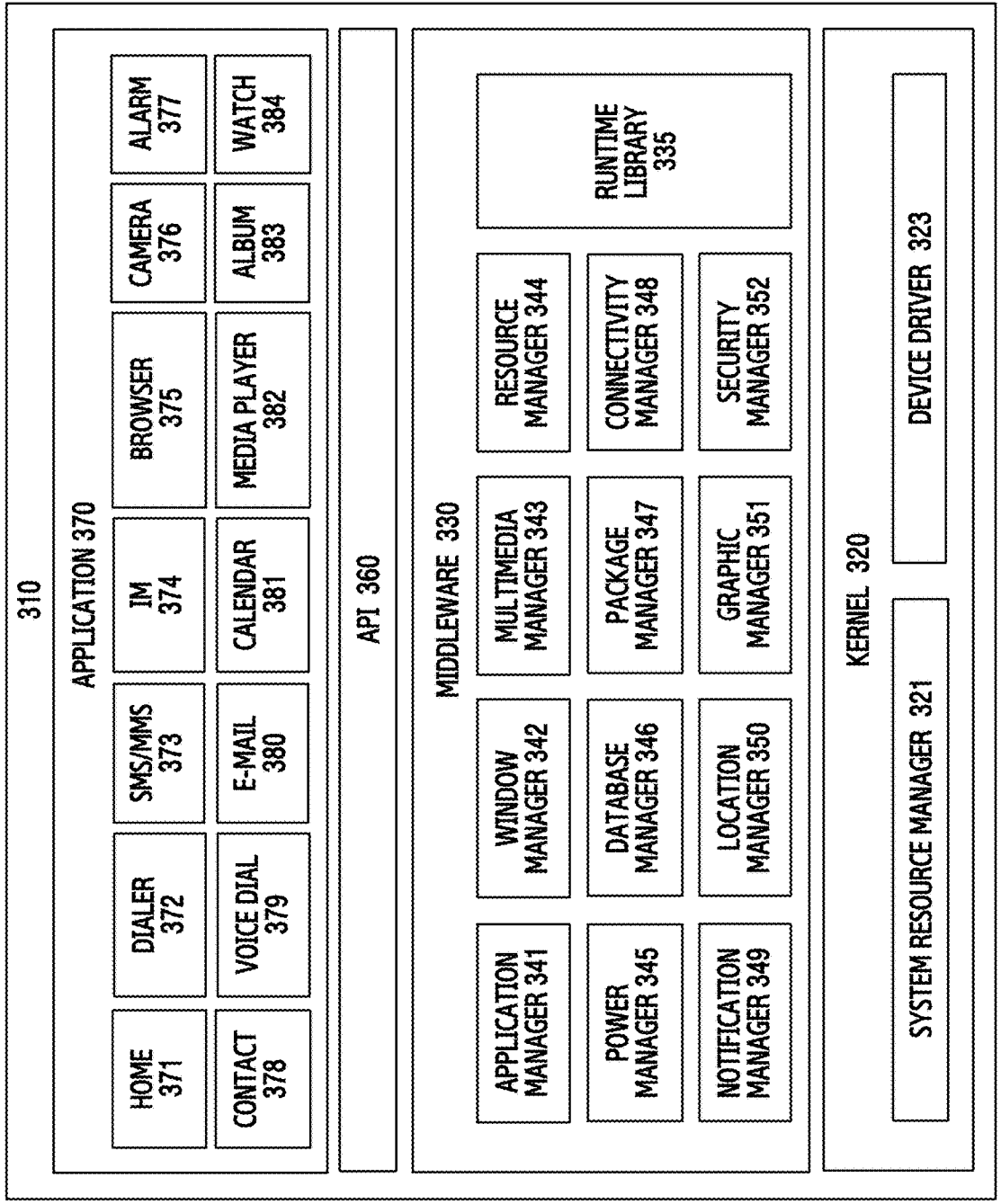
FIG. 3 illustrates a block diagram of a program module according to various embodiments of the present disclosure.

FIG. 3 is a block diagram illustrating an example program module according to various example embodiments of the present disclosure.

According to an embodiment, the program module 310 (for example, the program 140) may include an Operating System (OS) for controlling resources related to the electronic device (for example, the electronic device 101) and/or various applications (for example, the application programs 147) executed in the operating system. The operating system may be, for example, Android, iOS, Windows, Symbian, Tizen, Bada, or the like.

The program module 310 may include a kernel 320, middleware 330, an API 360, and/or an application 370. At least some of the program module 310 may be preloaded on the electronic apparatus, or may be downloaded from an external electronic apparatus (e.g., the electronic device 102 or 104, or the server 106).

The kernel 320 (e.g., the kernel 141) may include, for example, a system resource manager 321 and/or a device driver 323. The system resource manager 321 may perform the control, allocation, retrieval, or the like of system resources. According to an embodiment of the present disclosure, the system resource manager 321 may include a process manager, a memory manager, a file system manager, or the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function that is used by the applications 370 in common or provide various functions to the applications 370 through the API 360 so that the applications 370 can efficiently use limited system resources within the electronic device. According to an example embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, or the like.

The application manager 341 may manage, for example, the life cycle of at least one of the applications 370. The window manager 342 may manage Graphical User Interface (GUI) resources used for the screen. The multimedia manager 343 may determine a format used to reproduce various media files, and may encode or decode a media file by using a coder/decoder (codec) appropriate for the relevant format. The resource manager 344 may manage resources, such as a source code, a memory, a storage space, and the like of at least one of the applications 370.

The power manager 345 may operate together with a Basic Input/Output System (BIOS) to manage a battery or power and may provide power information for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic apparatus. The graphic manager 351 may manage a graphic effect, which is to be provided to the user, or a user interface related to the graphic effect. The security manager 352 may provide various security functions for system security, user authentication, and the like. According to an embodiment of the present disclosure, when the electronic apparatus (e.g., the electronic device 101) has a telephone call function, the middleware 330 may further include a telephony manager for managing a voice call function or a video call function of the electronic apparatus.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (for example, the application program 147) may include, for example, one or more applications which can provide functions such as home 371, dialer 372, SMS/MMS 373, Instant Message (IM) 374, browser 375, camera 376, alarm 377, contacts 378, voice dialer 379, email 380, calendar 381, media player 382, album 383, clock 384, health care (for example, measure exercise quantity or blood sugar), or environment information (for example, atmospheric pressure, humidity, or temperature information).

According to an embodiment of the present disclosure, the applications 370 may include an application (hereinafter, referred to as an "information exchange application" for convenience of description) supporting information exchange between the electronic apparatus (e.g., the electronic device 101) and an external electronic device (e.g., the electronic device 102 or 104). The application associated with information exchange may include, for example, a notification relay application for forwarding specific information to an external electronic device, or a device management application for managing an external electronic device.

For example, the notification relay application may include a function of delivering, to the external electronic apparatus (e.g., the electronic device 102 or 104), notification information generated by other applications (e.g., an SMS/MMS application, an email application, a health care application, an environmental information application, etc.) of the electronic device 101. Further, the notification relay application may receive notification information from, for example, an external electronic device and provide the received notification information to a user.

The device management application may manage (for example, install, delete, or update), for example, a function for at least a part of the external electronic device (for example, the electronic device 102 or 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include applications (for example, a health care application of a mobile medical appliance or the like) designated according to attributes of the external electronic device 102 or 104. According to an embodiment of the present disclosure, the application 370 may include an application received from the external electronic apparatus (e.g., the server 106, or the electronic device 102 or 104). According to an embodiment of the present disclosure, the application 370 may include a preloaded application or a third party application which can be downloaded from the server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, refer to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module' may be a minimum unit for performing one or more functions or a part thereof. The "module" may be mechanically or electronically implemented. For example, the "module" according to the present disclosure may include at least one of a dedicated processor, a CPU, an Application-Specific Integrated Circuit (ASIC) chip, a Field-Programmable Gate Arrays (FPGA), and a programmable-logic device for performing operations which has been known or are to be developed hereinafter.

According to various example embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

According to various embodiments of the present disclosure, a first electronic device can include a display functionally coupled to the first electronic device, and a processor. The processor can detect a user input in a schedule sharing menu displayed on an email application screen, display a schedule sharing input region according to the user input, receive schedule information input in the schedule sharing input region, store the schedule information in a schedule management application and a transfer protocol header, and send an email including the transfer protocol header to the second electronic device.

The processor can store Identification (ID) information for identifying the schedule information, in the schedule management application.

The processor can store the ID information in the transfer protocol header.

The processor can store the schedule information in an extension header of the transfer protocol header.

When detecting the user input, the processor can activate an extension header of the transfer protocol header.

According to various embodiments of the present disclosure, a second electronic device can include a display functionally coupled to the second electronic device, and a processor. The processor can display schedule information of an email received from the first electronic device, and a response menu on an email application screen, detects a user input in the response menu, display a schedule sharing response region according to the user input, receive response information input in the schedule sharing response region, store the response information in a transfer protocol header, and send a response email including the transfer protocol header to the first electronic device.

The processor can parse information of the transfer protocol header of the received email, and display an icon corresponding to the received email based on the parsed transfer protocol header information.

The processor can store ID information of the received email in the transfer protocol header.

The response menu can include an accept menu, a hold menu, and a reject menu.

The response information can include a flag indicating any one of accept, hold, and reject of a schedule sharing request of the schedule information.

The processor can store the response information in an extension header of the transfer protocol header.

The processor can store the schedule information in a schedule management application according to the response email transmission.

According to various embodiments of the present disclosure, a first electronic device can include a display functionally coupled to the first electronic device, and a processor. The processor can receive a response email including a transfer protocol header from the second electronic device, parse a flag indicating any one of accept, hold, and reject of a schedule sharing request, and ID information in the transfer protocol header, and update status information of a schedule management application based on the parsed flag and ID information.

Figure 4:
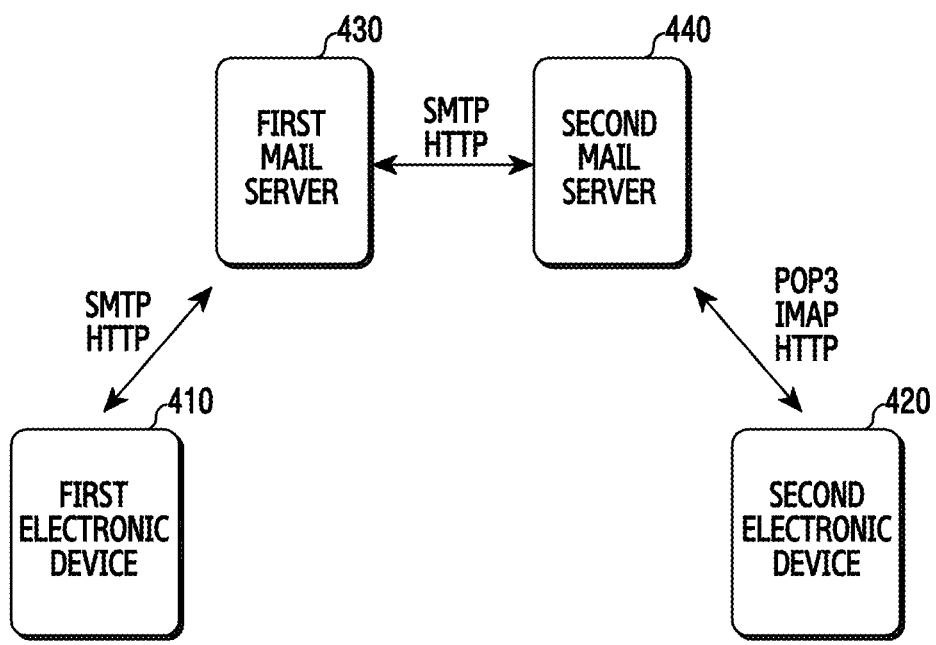
FIG. 4 illustrates schedule sharing according to various embodiments of the present disclosure.

FIG. 4 illustrates schedule sharing according to various embodiments of the present disclosure.

Referring to FIG. 4, in an embodiment, a first electronic device 410, a first mail server 430, a second electronic device 420, and a second mail server 440 are depicted. The first electronic device 410 can send an electronic mail (email) to the first mail server 430 based on an email transfer protocol of Simple Mail Transfer Protocol (SMTP) and a transfer protocol such as HyperText Transfer Protocol (HTTP). The first mail server 430 can send an email to the second mail server 440 based on protocols such as SMTP and HTTP. The second electronic device 420 can receive an email from the second mail server 440 based on an email retrieval protocol such as Internet Messaging Access Protocol (IMAP) and Post Office Protocol (POP) 3 and the transfer protocol of HTTP. The protocols of the present disclosure can be set in various manners and are not limited to those protocols.

Although not depicted in the drawing, contrary to the flow of FIG. 4, the second electronic device 420 can send an email to the second mail server 440 based on the email transfer protocol of the SMTP and the transfer protocol of the HTTP. The second mail server 440 can send an email to the first mail server 430 based on the protocols of the SMTP and the HTTP. The first electronic device 410 can receive an email from the first mail server 430 based on the email retrieval protocol of the IMAP and the POP3 and the transfer protocol of the HTTP. The protocols of the present disclosure can be set in various manners and are not limited to this manner.

In an embodiment, the first electronic device 410 and the second electronic device 420 can send and receive emails via the first mail server 430 and the second mail server 440. To ease the understanding, the first electronic device 410 sends an email and the second electronic device 420 receives the email and sends a response email to the first electronic device 410 in FIG. 6 through FIG. 11. Notably, the second electronic device 420 can send an email and the first electronic device 410 can receives the email and sends a response email to the first electronic device 410. The scope of the present disclosure is not limited to those examples.

Although on depicted in the drawing, the first electronic device 410 and the second electronic device 420 can send and receive emails via one mail server. For example, unlike FIG. 4, the first electronic device 410 and the second electronic device 420 can, but not limited to, share one mail server.

In an embodiment, the first electronic device 410 and the second electronic device 420 can store an email application having the same email protocol and transfer protocol. For example, the first electronic device 410 and the second electronic device 420 can receive an email from the first mail server 430 and the second mail server 440 respectively according to the IMAP or the POP3. Hence, the first electronic device 410 and the second electronic device 420 can include, but not limited to, the email application configured with the mail retrieval protocol corresponding to the IMAP or the POP3.

In an embodiment, the first electronic device 410 and the second electronic device 420 can employ various electronic devices capable of executing the email application as mentioned above. For example, the first electronic device 410 and the second electronic device 420 as described in the present disclosure can include, but not limited to, a television, a mobile phone, a smart phone, a laptop computer, a desktop PC, a laptop PC, a tablet PC, an electronic book terminal, a digital broadcasting terminal, a PDA, a PMP, a medical device, a digital camera, a smart TV, a set-top box, and so on.

In an embodiment, when sending the email to the first mail server 430 and the second mail server 440, the first electronic device 410 and the second electronic device 420 can also send a request message according to the transfer protocol. For example, the first electronic device 410 and the second electronic device 420 can send an http request message. The HTTP is the transfer protocol conforming to a server/client model for exchanging data on Internet. The HTTP, which is an application layer protocol, can operate above a Transmission Control Protocol (TCP)/Internet Protocol (IP) and deliver any kind of data. The HTTP is designed to transmit HyperText Markup Language (HTML) document and contents such as images, videos, audios, texts. Since the email frequently delivers various contents, not merely the text, the first electronic device 410 and the second electronic device 420 can send and receive an email together with an email request message and the http request message according to the HTTP. Notably, the message type transmitted with the email, is not limited to those messages, and the email can deliver a message according to other network layer protocols or a different protocol of the same network layer.

For the sake of the understanding, an email including scheduling information transmitted from the first electronic device 410 to the second electronic device 420 is referred to as a schedule sharing email, and a response email including response information transmitted from the second electronic device 420 to the first electronic device 410 is referred to as a schedule sharing response email.

Figure 5:
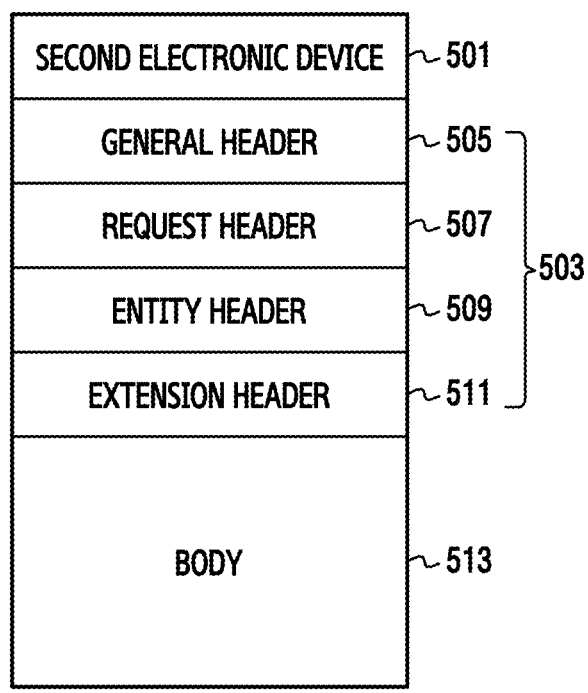
FIG. 5 illustrates a http request message according to an embodiment of the present disclosure.

FIG. 5 illustrates an http request message according to an embodiment of the present disclosure.

FIG. 5 depicts the http request message according to the HTTP. In an embodiment, an http header 503 can contain information for determining an operation between the first electronic device 410 or the second electronic device 420 and the first mail server 430 or the second mail server 440. Hereafter, the http request message is explained with, for example, the first electronic device 410 and the first mail server 430. A request line 501 can contain information such as Internet address for the transmission or the reception or HTTP version. The http header 503 can contain email information and include a general header 505, a request header 507, an entity header 509, and an extension header 511. A body 513 can contain email content information. It is noted that the technical idea of the present disclosure is not limited to this embodiment.

In the http header 503, the general header 505 can be used by both of the first electronic device 410 and the first mail server 430, and can include, but not limited to, a connection header enabling the first mail server 430 and the first mail server 430 to define an option for request/response connection, a Date header for providing a date and a time of the created message, and a Multipurpose Internet Mail Extensions (MIME)-Version header notifying a MIME version of a sender.

In an embodiment, the request header 507, which is a header for the http request message, can be used for the first electronic device 410 to provide additional information to the first mail server 430. The request header 507 can include, but not limited to, a GET header requesting a Uniform Resource Identifier (URI), a POST header requesting that the first mail server 430 accept form input field data of the first electronic device 410, and a HEAD header requesting only header information of document.

In an embodiment, the entity header 509 can be a header for entity of the http request message. The entity header 509 can include, but not limited to, an Allow header which arranges request methods for the entity, a Location header notifying an actual location of the entity to the first electronic device 410, and a Content-Length header indicating a data length following the header.

In an embodiment, the extension header 511 can input a header of a new function besides preset headers. For example, the extension header 511 can include an X-Priority field provided as an extension field. The X-Priority field is empty and, if necessary, can store information for the email. The extension header 511 can be used to store, but not limited to, schedule information and ID information in the email transmission. The extension header 511 shall be elucidated by referring to FIGS. 6, 7A, and 7B.

Figure 6:
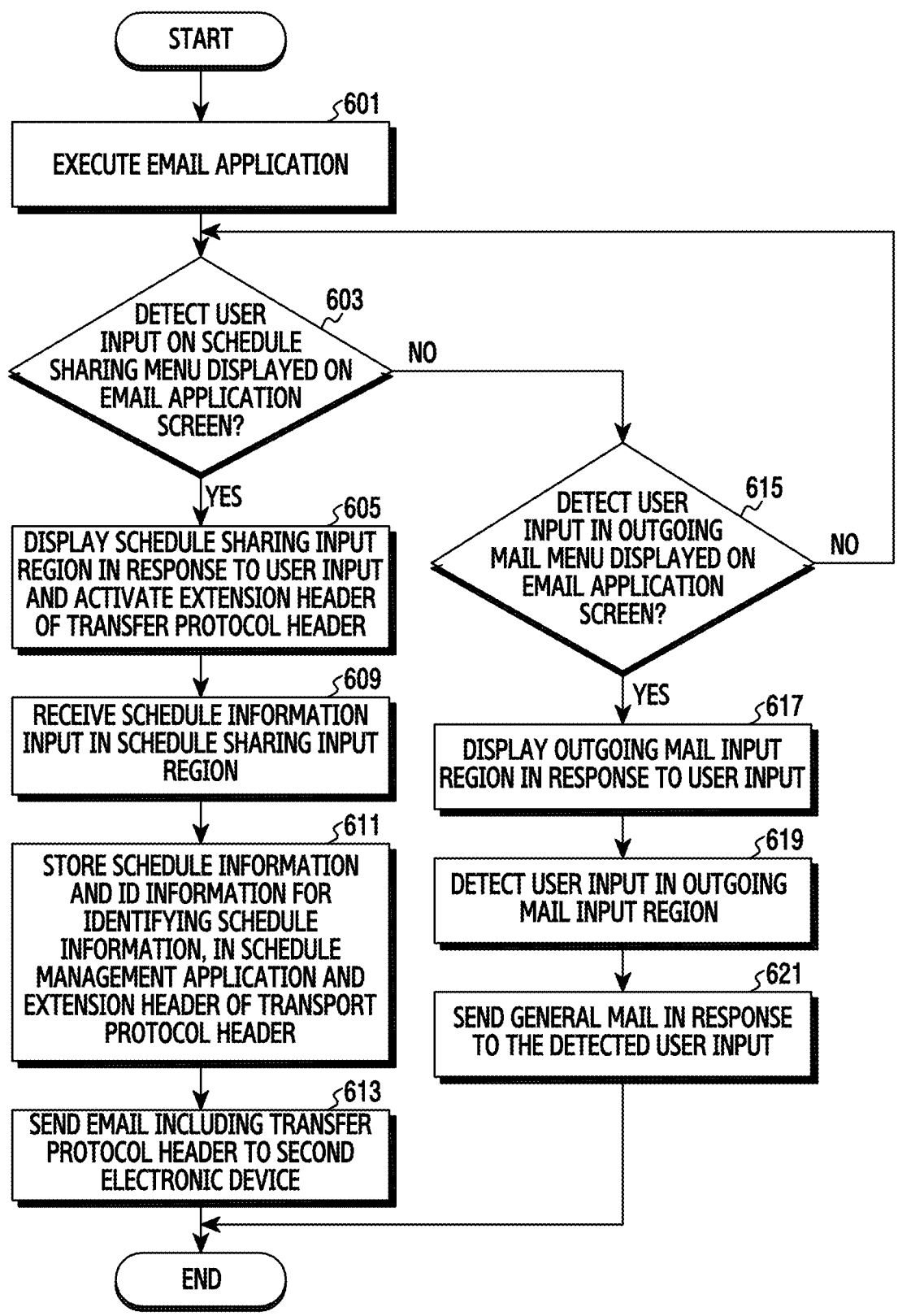
FIG. 6 illustrates a flowchart of a method for sending an email including schedule information of a first electronic device according to an embodiment of the present disclosure.

FIG. 6 illustrates a flowchart of a method for sending an email including schedule information of a first electronic device according to an embodiment of the present disclosure.

Figure 7A:
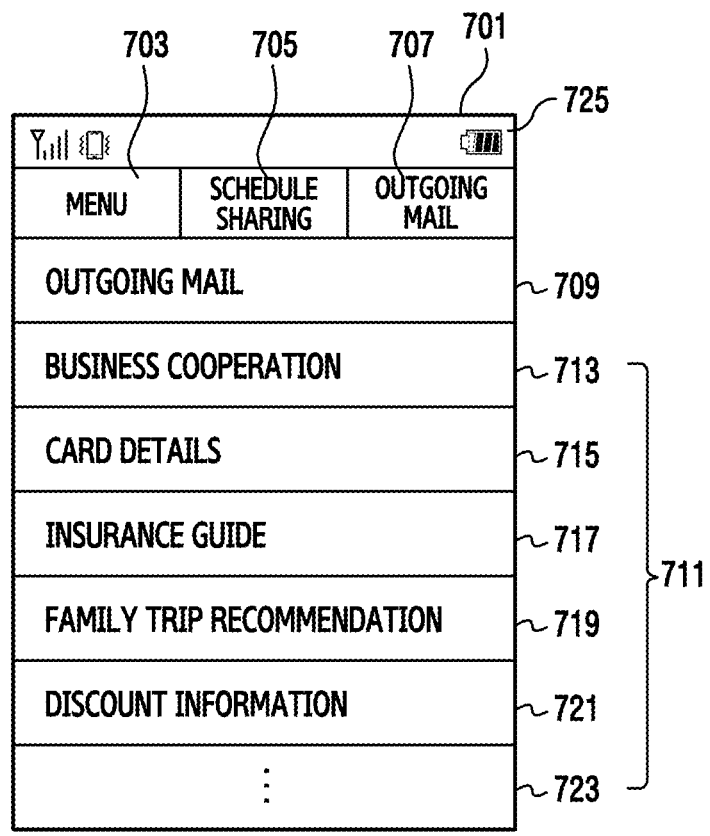
FIGS. 7A and 7B illustrate email transmission including schedule information of a first electronic device according to an embodiment of the present disclosure.
Figure 7B:
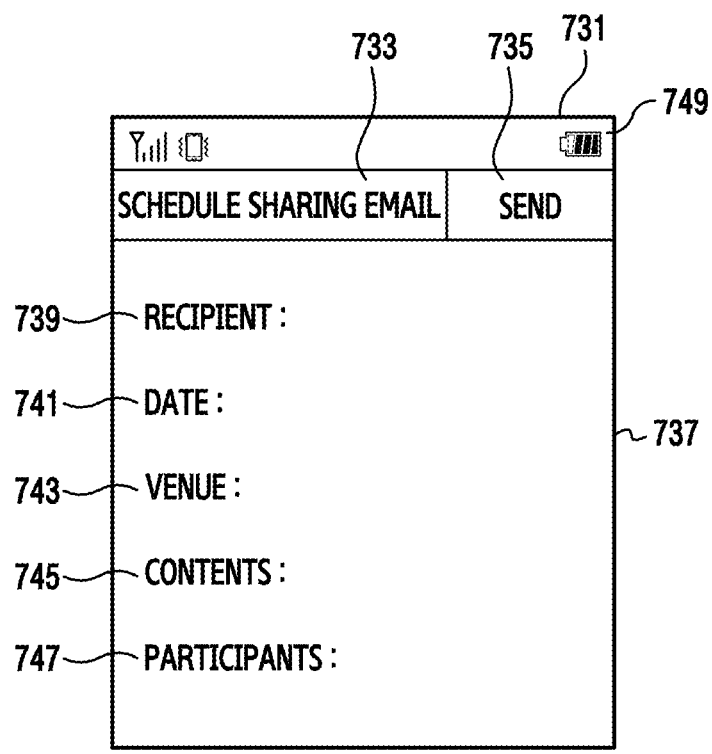

FIGS. 7A and 7B illustrate email transmission including schedule information of a first electronic device according to an embodiment of the present disclosure.

Referring to FIGS. 6, 7A, and 7B, in operation 601, the processor of the first electronic device 410 can execute an email application. The email application can be configured with the SMTP transfer protocol and the IMAP/POP3 retrieval protocol. The email application can send various data formats to the first mail server 430 according to the transfer protocol. The technical ideas of the present disclosure are not limited to this example.

FIG. 7A depicts an email application display region 701. The email application display region 701 can include, but not limited to, a MENU 703, a schedule sharing menu 705, an outgoing mail menu 707, an inbox menu 709, an inbox list 711, and a first electronic device status window 725. Besides, the electronic device can display various menus relating to email application functions. The MENU 703 can be a general menu for selecting various menus of the email application such as inbox, sent mailbox, mailbox defined by a user, all mails, and outbox. The schedule sharing menu 705 can select a schedule sharing email for simply sharing a schedule besides a general mail. The outgoing mail menu 707 can select a general mail which displays a separate input region for texts. The inbox menu 709 can notify that the inbox list 711 is currently displayed. The inbox list 711 can display titles written by mail senders. For example, the tittles written by the senders can include a business cooperation mail 713, a card details mail 715, an insurance guide mail 717, a family trip recommendation mail 719, and a discount information mail 721. Besides, a blank region 723 indicating other mails not displayed can be displayed. When a user selects mails, details of a corresponding mail can be displayed in a separate window. The first electronic device status window 725 can display, but not limited to, a communication connection status, a bell sound status, and a battery status of the first electronic device 410.

In operation 603, the processor of the first electronic device 410 can detect a user input in the schedule sharing menu 705 displayed on an email application screen. The user can send a schedule sharing email containing schedule information in order to share the schedule with other party, and select the schedule sharing menu 705 to send the schedule sharing email. The technical ideas of the present disclosure are not limited to this example.

Unlike FIG. 7A, the schedule sharing menu 705 can be displayed after the outgoing mail menu 707 is selected. For example, the processor of the first electronic device 410 can display an outgoing mail input region when the user selects the outgoing mail, and display the schedule sharing menu in part of the outgoing mail input region. Instead, when a separate outgoing menu is selected, the processor of the first electronic device 410 can display, but not limited to, a popup window for selecting the schedule sharing menu 705 or the outgoing mail menu 707. The schedule sharing menu 705 for activating the schedule sharing email can be displayed in various input regions of the email application.

In operation 605, the processor of the first electronic device 410 can display a schedule sharing input region 737 according to the user input. The schedule sharing input region 737 can be provided for the user to input schedule information. In addition, the processor of the first electronic device 410 can activate an extension header of a transfer protocol header in response to the user input detected. For example, the processor of the first electronic device 410 can activate the extension header of the http header. The processor of the first electronic device 410 can activate the X-Priority field provided as an extension field in the extension header. Besides, the processor of the first electronic device 410 can use other storage spaces of the extension header.

Meanwhile, the extension header of the transfer protocol header is activated before or simultaneously with the schedule information input, when to activate the extension header of the transfer protocol header can change. For example, in operation 611, the extension header of the transfer protocol header can be activated and, but not limited to, concurrently schedule information and ID information can be stored in the extension header of the transfer protocol header.

FIG. 7B depicts an email application display region 731. The email application display region 731 can include a schedule sharing email menu 733, a send menu 735, the schedule sharing input region 737, and a first electronic device status window 749. The schedule sharing email menu 733 can indicate a schedule sharing input region. The send menu 735 can activate a function which sends the schedule sharing email. The first electronic device status window 749 can display a communication connection status, a bell sound status, and a battery status of the first electronic device 410. The schedule sharing input region 737 can display texts of a recipient 739, a date 741, a venue 743, contents 745, and participants 747. The texts displayed in the schedule sharing input region 737 are preset and can ease the user input. The texts displayed in the schedule sharing input region 737 can be preset in the email application or modified by user setting. Accordingly, the texts displayed in the schedule sharing input region 737 can be changed to facilitate the schedule sharing. The user can input a schedule to share with other party based on the preset texts in the schedule sharing input region 737. The schedule sharing input region 737 can be set in various manners and is not limited to this format.

Although not depicted in the drawings, the processor of the first electronic device 410 can display, but not limited to, a menu which imports schedule information previously transmitted or stored, and the user can immediately send the existing schedule information using the import menu without having to re-input the schedule information.

In operation 609, the processor of the first electronic device 410 can receive input of the schedule information in the schedule sharing input region 737. For example, the user can input schedule information which, but not limited to, watch a baseball game at baseball stadium on 25 Oct. 2016.

In operation 611, the processor of the first electronic device 410 can store the schedule information and ID information for identifying the schedule information, in a schedule management application. The schedule management application can provide a user interface similar to a calendar, input various data in the date, and alarm the input data to the user on the date. For example, the schedule information and the ID information can be recorded in a database of the schedule management application, and the database of the schedule management application can be stored in a memory of the first electronic device 410. The ID information can identify schedule information. For example, the user can share multiple schedule information with other parties and store the schedule information in the schedule management application in sequence. Hence, the processor can generate, but not limited to, ID information corresponding to the schedule information in order to identify the schedule information.

The processor of the first electronic device 410 can store the schedule information and the ID information in a separate memory space, and synchronize the schedule management application with the schedule information and the ID information. The technical ideas of the present disclosure are not limited to this example.

The processor of the first electronic device 410 can store the schedule information and the ID information in the extension header of the transfer protocol header. For example, the processor of the first electronic device 410 can store the schedule information and the ID information in the extension header of the http header, and store the schedule information in, but not limited to, the X-Priority field provided as the extension field in the extension header. The X-Priority field can be provided as a blank field so that the user can input separate information. Other field of the http extension header can be used.

Storing the schedule information and the ID information in the schedule management application and storing the schedule information and the ID information in the extension header of the transfer protocol header are not limited to the simultaneous execution and are not limited to the order of FIG. 6. According to an embodiment of the present disclosure, operation 611 and operation 613 can be conducted in sequence, or in a variable order according to a type, characteristics, or setting of the electronic device.

In operation 613, the processor of the first electronic device 410 can send the schedule sharing email including the transfer protocol header to the second electronic device 420. For example, the processor of the first electronic device 410 can detect selection of the send menu 735 above the schedule sharing input region 737, and thus send the schedule sharing email including the schedule information and the ID information to a user of the second electronic device 420 which is input in the recipient of the schedule sharing input region 737. The schedule sharing email can include a schedule sharing email request message and the http request message, the http header can be included in the http request message, and the http request message can be transmitted together with the schedule sharing email message. The http header and the schedule sharing email can be transmitted in various fashions, which is not limited to this method.

In operation 615, when not detecting the selection of the schedule sharing menu 705, the processor of the first electronic device 410 can detect a user input in the outgoing mail menu 707 displayed on the email application screen. In operation 617, the processor of the first electronic device 410 can display an outgoing mail input region in response to the user input. The outgoing mail input region can be a text input region provided from the email application. In operation 619, the processor of the first electronic device 410 can detect a user input in the outgoing mail input region. In operation 621, the processor of the first electronic device 410 can send a general mail including information input in the outgoing mail input region in response to the detected user input. The technical idea of the present disclosure is not limited to this embodiment.

When not detecting the outgoing mail menu selection in operation 615, the processor of the first electronic device 410 can re-determine whether the schedule sharing menu is selected and keep displaying the email application display region 701 or end the email application. The technical idea of the present disclosure is not limited to this embodiment.

After operation 613, the processor of the first electronic device 410 can end the email application, display a message window notifying the schedule sharing email transmission completed, or send a new schedule sharing email by displaying the email application display region 701 again. The technical idea of the present disclosure is not limited to this embodiment.

Figure 8:
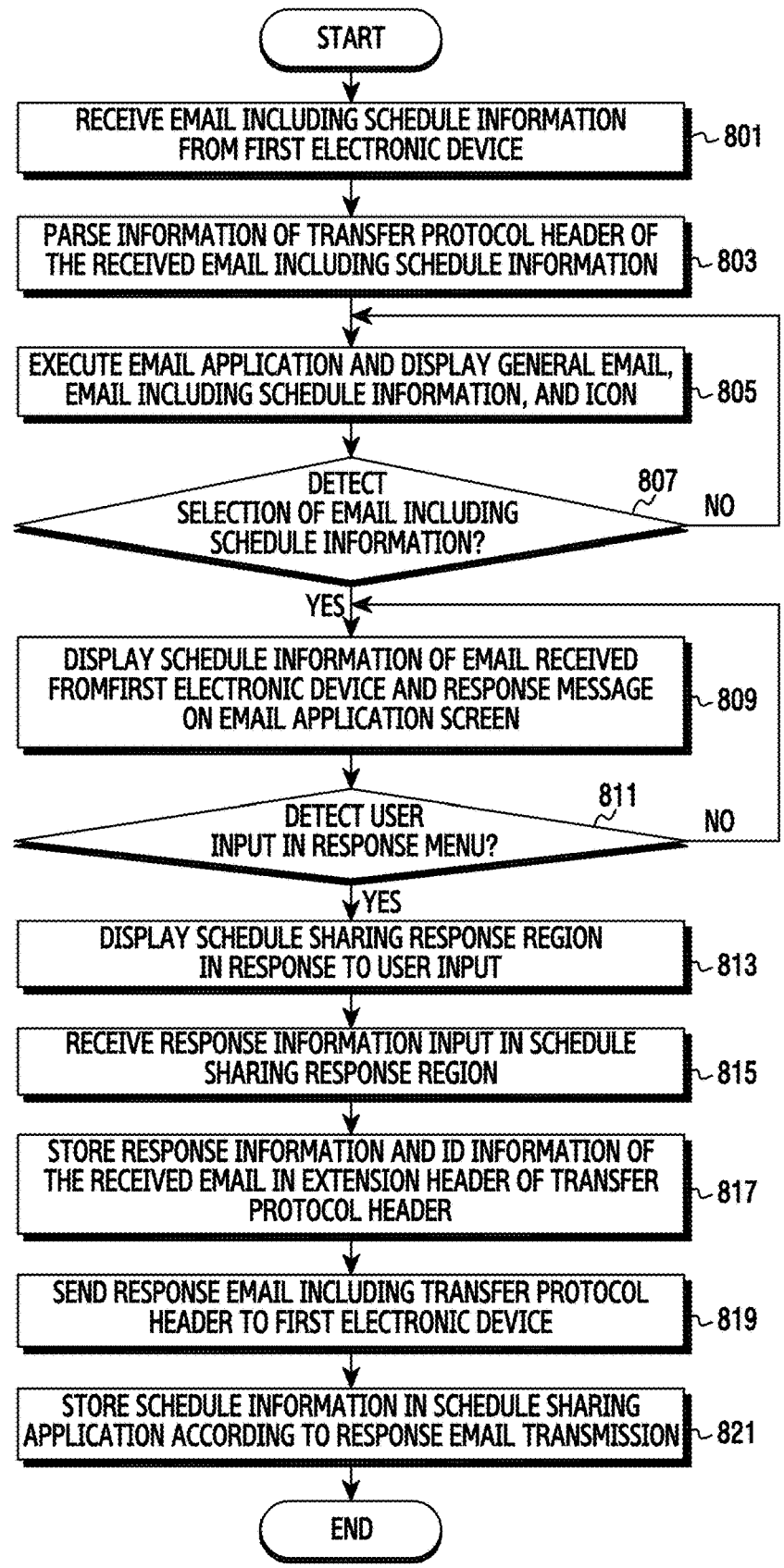
FIG. 8 illustrates a flowchart of a method for sending a response email of a second electronic device according to an embodiment of the present disclosure.

FIG. 8 illustrates a flowchart of a method for sending a response email of a second electronic device according to an embodiment of the present disclosure.

Figure 9A:
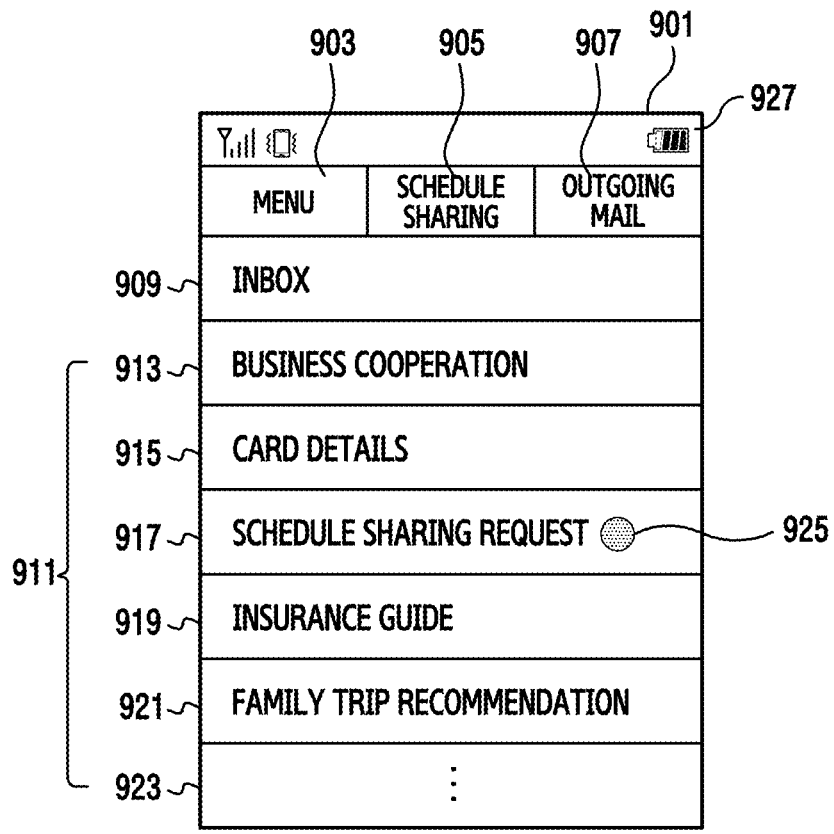
FIGS. 9A, 9B, and 9C illustrate transmission of a response email of a second electronic device according to an embodiment of the present disclosure.
Figure 9B:
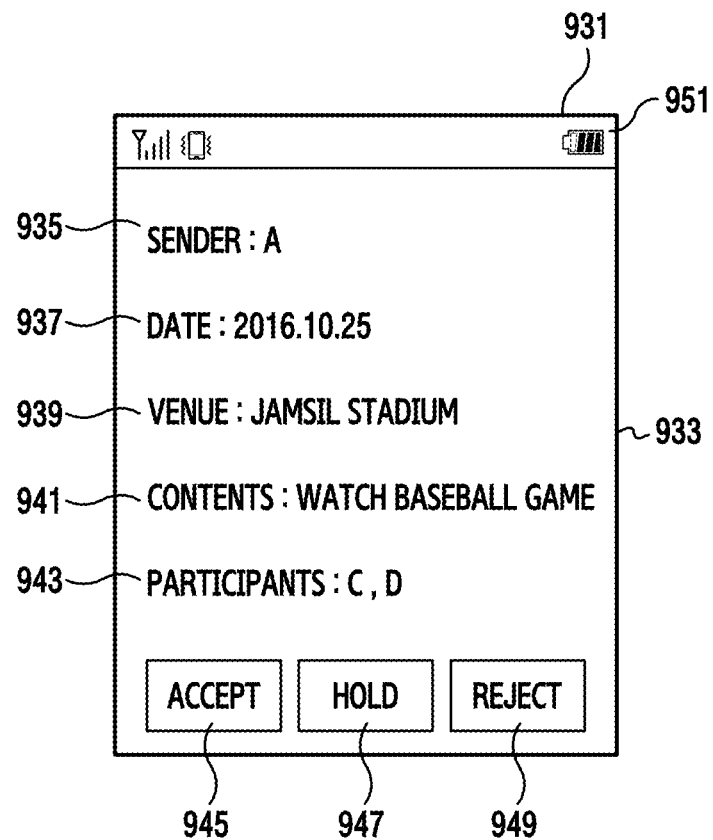
Figure 9C:
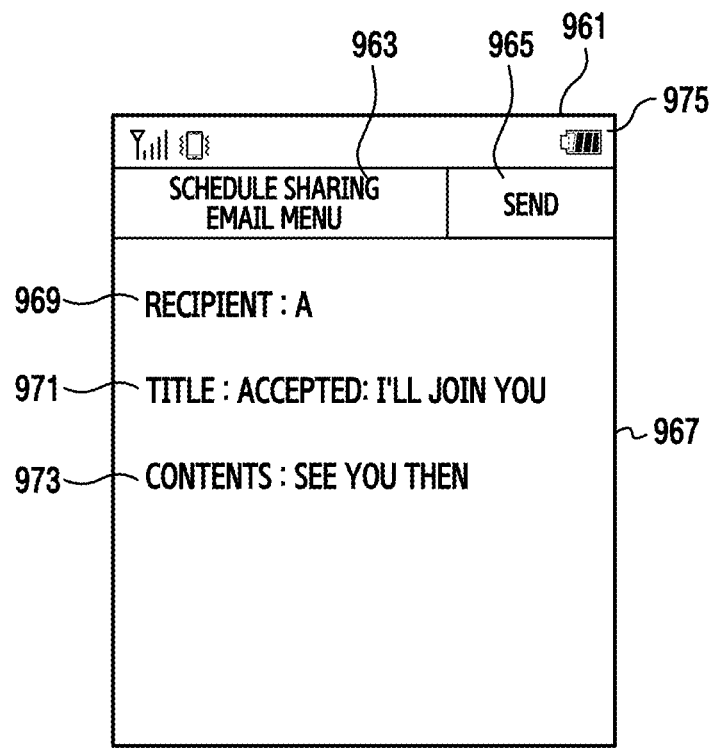

FIGS. 9A, 9B, and 9C illustrate transmission of a response email of a second electronic device according to an embodiment of the present disclosure.

Referring now to FIG. 8 through FIG. 9C, in operation 801, a processor of the second electronic device 420 can receive a schedule sharing email including schedule information from the first electronic device 410.

In operation 803, the processor of the second electronic device 420 can parse information of a transfer protocol header of the received schedule sharing email including the schedule information. The processor of the second electronic device 420 can store and display a general mail and the schedule sharing email separately using the parsed information. The processor of the second electronic device 420 can parse the schedule information upon receiving the schedule sharing email, parse the schedule information at the same time as email application execution, or parse the schedule information when detecting a user input which selects the schedule sharing email. Notably, when and how to parse the schedule information in the schedule sharing email can be determined in, but not limited to, various manners.

In operation 805, as executing the email application, the processor of the second electronic device 420 can display, but not limited to, the general email, the schedule sharing email including the schedule information, and an icon.

For example, FIG. 9A depicts an email application display region 901. The email application display region 901 can include, but not limited to, a MENU 903, a schedule sharing menu 905, an outgoing mail menu 907, an inbox menu 909, an inbox list 911, and a second electronic device status window 927. Besides, the processor of the second electronic device 420 can display various menus relating to email application functions. The MENU 903 can be a general menu for selecting various menus of the email application such as inbox, outgoing mailbox, mailbox defined by the user, all mails, and outbox. The schedule sharing menu 905 can select a schedule sharing email for simply sharing a schedule besides the general mail. The outgoing mail menu 907 can select a general mail which displays a separate input region for texts. The inbox menu 909 can notify that the inbox list 911 is currently displayed. The inbox list 911 can display titles written by mail senders. For example, the tittles written by the senders can include a business cooperation mail 913, a card details mail 915, a schedule sharing request mail 917, an insurance guide mail 919, and a family trip recommendation mail 921. Besides, a blank region 923 indicating other mails not displayed can be displayed. When the user selects mails, details of a corresponding mail can be displayed in a separate window. The second electronic device status window 927 can display, but not limited to, a communication connection status, a bell sound status, and a battery status of the second electronic device 420.

In an embodiment, using the information parsed in operation 803, the processor of the second electronic device 420 can display an icon 925 corresponding to the received schedule sharing email in, but not limited to, the schedule sharing request 917 of the email application display region 901. The icon 925 can be displayed in various fashions. Without displaying a separate icon, the processor of the second electronic device 420 can highlight the schedule sharing request 917 to distinguish it from the general mail. The technical idea of the present disclosure is not limited to this embodiment.

In operation 807, the processor of the second electronic device 420 can detect selection of the schedule sharing email including the schedule information. For example, the processor of the second electronic device 420 can detect a user input which selects the schedule sharing request 917 of the email application display region 901. The schedule sharing request 917 can activate a function which displays the received schedule sharing email when, but not limited to, the user touches it. When not detecting the selection of the schedule sharing email, the processor of the second electronic device 420 can, but not limited to, keep displaying the email application display region 901 or end the email application.

When, but not limited to, detecting the selection of the schedule sharing email, the processor of the second electronic device 420 can activate an extension header of a transfer protocol header. The extension header of the transfer protocol header can be activated before or at the same time as storing response information or ID information in the extension header.

In operation 809, the processor of the second electronic device 420 can display the schedule information of the email received from the first electronic device 410 and a response menu on an email application screen. The response menu can include an accept menu, a hold menu, and a reject menu. For example, the processor of the second electronic device 420 can display an email application display region 931 as shown in FIG. 9B. The email application display region 931 can include a schedule information display region 933 and a second electronic device status window 951. The schedule information display region 933 can include the schedule information of a sender 935, a date 937, a venue 939, contents 941, and participants 943. For example, a user A (the user of the first electronic device 410) wants to, but not limited to, watch a baseball game with users C and D (friends) at stadium on 25 Oct. 2016. An accept menu 945 can be selected when the user of the second electronic device 420 accepts the schedule of the schedule information. A hold menu 947 can be selected when the user of the second electronic device 420 holds the schedule of the schedule information. A reject menu 949 can be selected when the user of the second electronic device 420 rejects the schedule of the schedule information. The accept menu 945, the hold menu 947, and the reject menu 949 can activate a function which displays a schedule sharing response region. The method and function for displaying the schedule information of the accept menu, the hold menu, and the reject menu can be modified in, but not limited to, various manners. The second electronic device status window 951 can display, but not limited to, a communication connection status, a bell sound status, and a battery status of the second electronic device 420.

When any one of the accept menu 945, the hold menu 947, and the reject menu 949 is selected, a flag indicating any one of the accept, the hold, and the reject of the schedule sharing request can be created and stored in the transfer protocol header. When to create and store the flag indicating any one of the accept, the hold, and the reject of the schedule sharing request is not limited to this example and can be changed variously.

In operation 811, the processor of the second electronic device 420 can detect a user input in the response menu. In operation 813, the processor of the second electronic device 420 can display the schedule sharing response region in response to the user input. For example, the processor of the second electronic device 420 can detect the selection of the accept menu 945 and display an object indicating the schedule sharing request accepted in the schedule sharing response region. The processor of the second electronic device 420 can display an email application display region 961 as shown in FIG. 9C. The email application display region 961 can include a schedule sharing response email region 963, a send menu 965, a second electronic device status window 975, and a schedule sharing response region 967. The schedule sharing response email region 963 can notify that the schedule sharing response region 967 is currently displayed. The send menu 965 can activate a function which sends the schedule sharing response email. The second electronic device status window 975 can include the communication connection status, the bell sound status, and the battery status of the second electronic device 420. The schedule sharing response region 967 can include a recipient 969, a title 971, and contents 973. For example, the processor of the second electronic device 420 can automatically display a text "Recipient: A" in the recipient 969, a text "Title" in the title 971, a text "Contents" in the contents 973, and "Accepted :" in the title 971. "Accepted :" can indicate that the user of the second electronic device 420 accepts the schedule sharing. By contrast, the processor of the second electronic device 420 can automatically display an email address of the sender of the schedule sharing email in the recipient 969. For example, the user can add a text "I'll join you" in the title 971 and a text "See you then" in the contents 973. How to display the schedule sharing response region 967 can be determined variously and is not limited to this example.

When not detecting the response menu selection in operation 811, the processor of the second electronic device 420 can, but not limited to, display the schedule sharing email or terminate the email application.

In operation 815, the processor of the second electronic device 420 can receive a response information input in the schedule sharing response region 967. The response information can include a sender email address of the schedule sharing response email, and input information written in the contents 973.

In operation 817, the processor of the second electronic device 420 can store response information, ID information of the received schedule sharing email, and the flag indicating one of the accept, the hold, and the reject of the schedule sharing request, in the extension header of the transfer protocol header. For example, the processor of the second electronic device 420 can store them in, but not limited to, the extension header of the http header, and store the response information, the ID information, and the flag in an X-Priority field which is provided as an extension field in the extension header. The X-Priority field can be provided as a blank field so that the user can input separate information. Other field of the http extension header can be used.

In operation 819, the processor of the second electronic device 420 can send the schedule sharing response email including the transfer protocol header to the first electronic device 410. For example, the processor of the second electronic device 420 can detect selection of the send menu 965 above the schedule sharing response region 967, and send the schedule sharing response email including the response information, the ID information, and the flag indicating one of the accept, the hold, and the reject of the schedule sharing request, to the user of the first electronic device 410 which is input in the recipient of the schedule sharing response region 967. The schedule sharing response email can include a schedule sharing response email request message and a transfer protocol request message, the transfer protocol header can be included in the transfer protocol request message, and the transfer protocol request message can be transmitted together with a schedule sharing response email message. The method for sending the transfer protocol header and the schedule sharing email can be determined variously and is not limited to this example.

In operation 821, the processor of the second electronic device 420 can store the schedule information and the ID information in the schedule sharing application according to the schedule sharing response email transmission. For example, as recording the schedule information and the ID information in a database of the schedule sharing application, the processor of the second electronic device 420 can provide a notification message to the user on a corresponding date of the sharing schedule, and the user can obtain the sharing schedule through a schedule management application. The technical idea of the present disclosure is not limited to this embodiment.

For example, the processor of the second electronic device 420 can detect the hold menu selected in operation 811. The processor of the second electronic device 420 can display the schedule sharing response region including an object indicating the schedule sharing request hold. For example, although not depicted in the drawing, the processor of the second electronic device 420 can automatically display "Tentative :" in the title 971. The object "Tentative :" can indicate that the user holds the schedule sharing. Hold can indicate that the user temporarily reserves the determination on the schedule sharing request. The method for displaying the schedule sharing response region can be determined variously and is not limited to this example.

For example, the processor of the second electronic device 420 can detect the reject menu selected in operation 811. The processor of the second electronic device 420 can display the schedule sharing response region including an object indicating the schedule sharing request rejected. For example, although not depicted in the drawing, the processor of the second electronic device 420 can automatically display "Decline :" in the title 971. The object "Decline :" can indicate that the user of the second electronic device 420 rejects the schedule sharing. The method for displaying the schedule sharing response region can be determined variously and is not limited to this example. Other components are the same as those in FIG. 9C of operation 813 and shall not be further described.

After operation 821, the processor of the second electronic device 420 can, but not limited to, end the email application or, display the email application display region 901 and send a new schedule sharing email.

Figure 10:
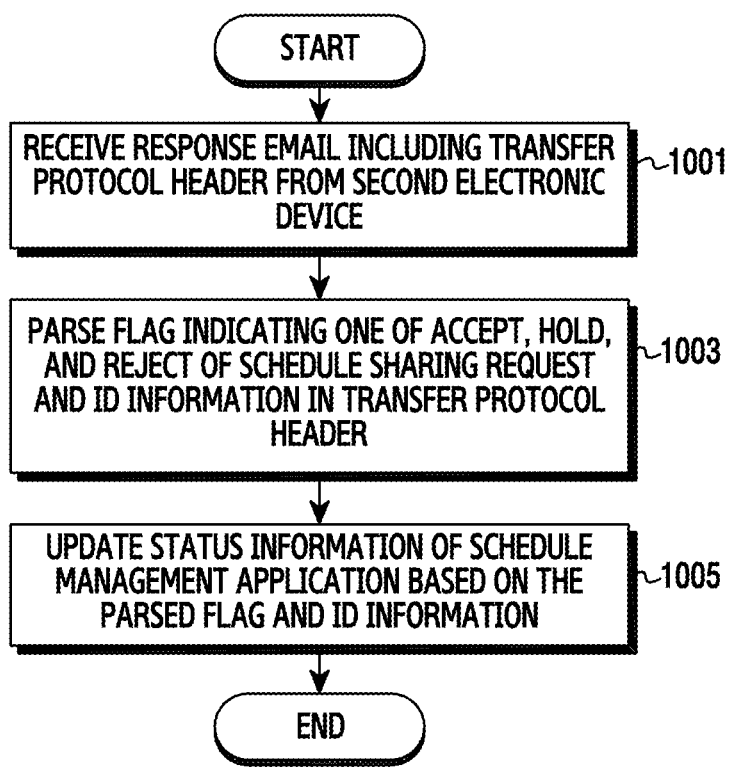
FIG. 10 illustrates a flowchart of a method for receiving a response email in a first electronic device according to an embodiment of the present disclosure.

FIG. 10 illustrates a flowchart of a method for receiving a response email in a first electronic device according to an embodiment of the present disclosure.

Figure 11:
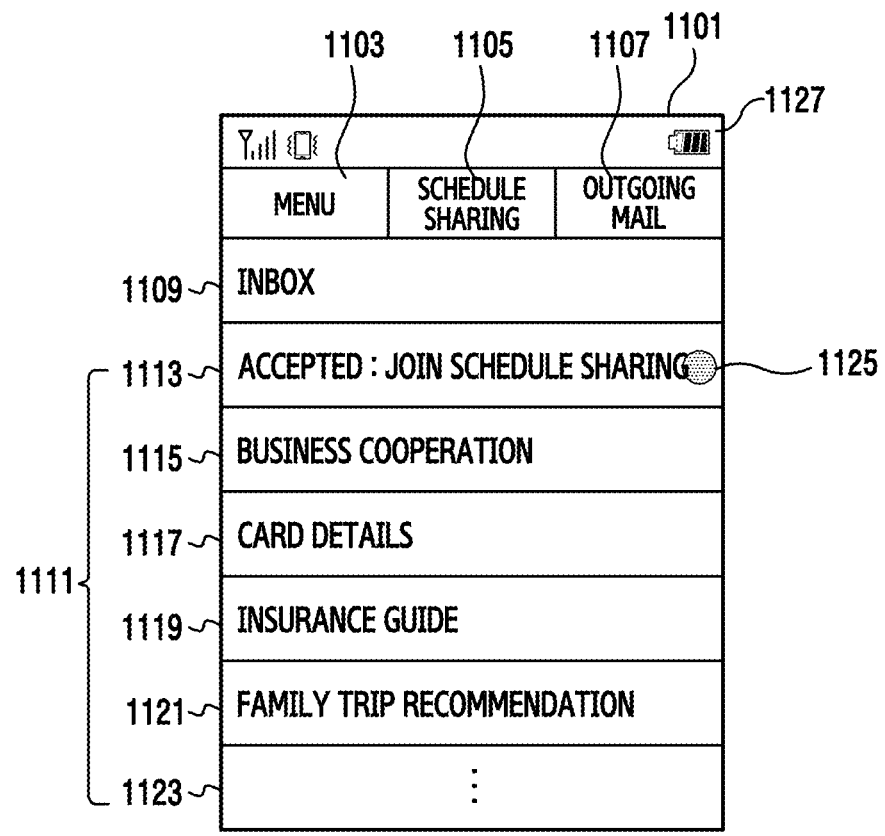
FIG. 11 illustrates response email received in a first electronic device according to an embodiment of the present disclosure.

FIG. 11 illustrates response email received in a first electronic device according to an embodiment of the present disclosure.

Referring to FIGS. 10 and 11, in operation 1001, a processor of the first electronic device 410 can receive a schedule sharing response email including a transfer protocol header from the second electronic device 420. An extension header of the transfer protocol header can include response information, ID information, and a flag indicating any one of accept, hold, and reject of a schedule sharing request. The ID information can be the same as, but not limited to, ID information transmitted from the first electronic device 410 to the second electronic device 420 in FIG. 6.

In operation 1003, the processor of the first electronic device 410 can parse the response information, the ID information, and the flag indicating any one of the accept, the hold, and the reject of the schedule sharing request in the schedule sharing response email among a plurality of emails.

In operation 1005, the processor of the first electronic device 410 can update status information of a schedule management application based on the parsed flag and ID information, and store and display a general email and a schedule sharing response email separately. For example, the processor of the first electronic device 410 can detect a schedule matching the ID information in a schedule management application based on the ID information, and update the status information according to the parsed flag. The status information can include information about whether a user of the second electronic device 420 joins the schedule, and the processor of the first electronic device 410 can record information about whether the user of the second electronic device 420 accepts, holds, or rejects the schedule, in the status information. Also, the processor of the first electronic device 410 can create and display an icon corresponding to the schedule sharing response email based on the ID information or the flag.

As above, the processor of the first electronic device 410 can receive the schedule sharing response email from the second electronic device 420, parse the flag and the ID information, and update the status information of the schedule management application, regardless of whether an email application is executed or not. For example, the processor of the first electronic device 410 can change the schedule information status information stored in the schedule management application, to the join of the user of the second electronic device 420 in operation 611 of FIG. 6.

According to an embodiment of the present disclosure, the processor of the first electronic device 410 can execute the email application, when the user selects the received schedule sharing response email, parse the flag and the ID information, and update the status information of the schedule management application. For example, the processor of the first electronic device 410 can execute the email application and display a general email, the schedule sharing response email, and an icon.

For example, FIG. 11 depicts an email application display region 1101. The email application display region 1101 can include, but not limited to, a MENU 1103, a schedule sharing menu 1105, an outgoing mail menu 1107, an inbox menu 1109, an inbox list 1111, and a first electronic device status window 1127. Besides, the processor of the first electronic device 410 can display various menus relating to email application functions. The MENU 103 can be a general menu for selecting various menus of the email application such as inbox, outgoing mailbox, mailbox defined by the user, all mails, and outbox. The schedule sharing menu 1105 can select a schedule sharing email for simply sharing a schedule besides the general mail. The outgoing mail menu 1107 can select a general mail which displays a separate input region for texts. The inbox menu 1109 can notify that the inbox list 111 is currently displayed. The inbox list 1111 can display titles written by mail senders. For example, the tittles written by the senders can include a schedule sharing response email 1113, business cooperation email 1115, a card details mail 1117, an insurance guide mail 1119, and a family trip recommendation mail 1121. Besides, a blank region 1123 indicating other mails not displayed can be displayed. The schedule sharing response email 1113 can display "Accepted :" indicating accept information, "Tentative :" indicating hold information, or "Decline :" indicating reject information, in the title. When the user selects mails, details of a corresponding mail can be displayed in a separate window. The first electronic device status window 1127 can display, but not limited to, a communication connection status, a bell sound status, and a battery status of the first electronic device 410.

In an embodiment, the processor of the first electronic device 410 can display an icon 1125 in, but not limited to, a schedule sharing join response email 1113 of the email application display region using the parsed information. The icon 1125 can be an object indicating the schedule sharing response email, and can be displayed in various fashions. Without displaying a separate icon, the processor of the first electronic device 410 can highlight the schedule sharing join response 1113 to distinguish it from the general mail. The technical idea of the present disclosure is not limited to this embodiment.

After operation 1005, the processor of the first electronic device 410 can, but not limited to, keep displaying the email application display region 1101 or end the email application.

According to various embodiments of the present disclosure, an operating method between a first electronic device and a second electronic device can include detecting, at the first electronic device, a user input in a schedule sharing menu displayed on an email application screen, displaying, at the first electronic device, a schedule sharing input region according to the user input, receiving, at the first electronic device, schedule information input in the schedule sharing input region, storing, at the first electronic device, the schedule information in a schedule management application and a transfer protocol header, and sending, at the first electronic device, an email including the transfer protocol header to the second electronic device.

Storing in the schedule management application can include storing, at the first electronic device, ID information for identifying the schedule information, in the schedule management application.

Storing in the transfer protocol header can include storing, at the first electronic device, the ID information in the transfer protocol header.

Storing in the transfer protocol header can include storing, at the first electronic device, the schedule information in an extension header of the transfer protocol header.

The operating method can further include, when detecting the user input, activating, at the first electronic device, an extension header of the transfer protocol header.

According to various embodiments of the present disclosure, an operating method between a first electronic device and a second electronic device can include displaying, at the second electronic device, schedule information of an email received from the first electronic device, and a response menu on an email application screen, detecting, at the second electronic device, a user input in the response menu, displaying, at the second electronic device, a schedule sharing response region according to the user input, receiving, at the second electronic device, response information input in the schedule sharing response region, storing, at the second electronic device, the response information in a transfer protocol header, and sending, at the second electronic device, a response email including the transfer protocol header to the first electronic device.

The operating method can further include parsing, at the second electronic device, information of the transfer protocol header of the received email, and displaying, at the second electronic device, an icon corresponding to the received email based on the parsed transfer protocol header information.

Storing in the transfer protocol header can include storing, at the second electronic device, ID information of the received email in the transfer protocol header.

The response menu can include an accept menu, a hold menu, and a reject menu.

The response information can include a flag indicating any one of accept, hold, and reject of a schedule sharing request of the schedule information.

Storing in the transfer protocol header can include storing, at the second electronic device, the response information in an extension header of the transfer protocol header.

The operating method can further include storing, at the second electronic device, the schedule information in a schedule management application according to the response email transmission.

According to various embodiments of the present disclosure, an operating method between a first electronic device and a second electronic device can include receiving, at the first electronic device, a response email including a transfer protocol header from the second electronic device, parsing, at the first electronic device, a flag indicating any one of accept, hold, and reject of a schedule sharing request and ID information in the transfer protocol header, and updating, at the first electronic device, status information of a schedule management application based on the parsed flag and ID information.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An operating method between a first electronic device and a second electronic device, the method comprising:
   executing, at the first electronic device, an email application for transmitting and receiving emails that include schedule information in a transfer protocol header, wherein the email application includes a schedule sharing menu;
   detecting, at the first electronic device, a user input that selects the schedule sharing menu;
   in response to detecting the user input, displaying, at the first electronic device, a schedule sharing input region including prompts for the schedule information;
   receiving, at the first electronic device, the schedule information corresponding to the prompts within the schedule sharing input region;
   storing, at the first electronic device, the schedule information in a schedule management application and the transfer protocol header; and
   transmitting, at the first electronic device, an email comprising the transfer protocol header to the second electronic device.

2. The operating method of claim 1, wherein storing in the schedule management application comprises:
   storing, at the first electronic device, identification (ID) information for identifying the schedule information, in the schedule management application.

3. The operating method of claim 2, further comprises:
   storing, at the first electronic device, the ID information in the transfer protocol header associated with the schedule management application.

4. The operating method of claim 1, wherein storing in the transfer protocol header comprises:
   storing, at the first electronic device, the schedule information in an extension header of the transfer protocol header.

5. The operating method of claim 1, further comprising:
   while detecting the user input, activating, at the first electronic device, an extension header of the transfer protocol header.

6. An operating method between a first electronic device and a second electronic device, the method comprising:
   executing, at the second electronic device, an email application for transmitting and receiving emails that include schedule information in a transfer protocol header;
   after receiving an email that includes the schedule information from the first electronic device, displaying, at the second electronic device, the schedule information included in the email and a response menu;
   detecting, at the second electronic device, a user input that selects the response menu;
   in response to detecting the user input, displaying, at the second electronic device, a schedule sharing response region;
   receiving, at the second electronic device, response information corresponding to prompts within the schedule sharing response region;
   storing, at the second electronic device, the response information in the transfer protocol header; and
   transmitting, at the second electronic device, a response email comprising the transfer protocol header to the first electronic device.

7. The operating method of claim 6, further comprising:
   parsing, at the second electronic device, information of the transfer protocol header of the email; and
   displaying, at the second electronic device, an icon corresponding to the email based on the parsed transfer protocol header information.

8. The operating method of claim 6, wherein storing in the transfer protocol header comprises:
   storing, at the second electronic device, Identification (ID) information of the email in the transfer protocol header.

9. The operating method of claim 6, wherein the response menu comprises an accept menu, a hold menu, and a reject menu.

10. The operating method of claim 9, wherein the response information comprises a flag indicating at least one of accept, hold, and reject of a schedule sharing request of the schedule information.

11. The operating method of claim 6, wherein storing in the transfer protocol header comprises:
    storing, at the second electronic device, the response information in an extension header of the transfer protocol header.

12. The operating method of claim 6, further comprising:
    storing, at the second electronic device, the schedule information in a schedule management application according to the response email.

13. An operating method between a first electronic device and a second electronic device, the method comprising:
    executing, at the first electronic device, an email application for transmitting and receiving emails that include schedule information in a transfer protocol header;
    receiving, at the first electronic device, a response email comprising the transfer protocol header from the second electronic device;
    parsing, at the first electronic device, a flag indicating at least one of accept, hold, and reject of a schedule sharing request and Identification (ID) information in the transfer protocol header; and
    updating, at the first electronic device, status information of a schedule management application based on the parsed flag and ID information.

14. A first electronic device comprising:
    a communication unit;
    a display functionally coupled to the first electronic device; and
    a processor coupled to the communication unit and the display, wherein the processor is configured to:
    execute an email application for transmitting and receiving emails that include schedule information in a transfer protocol header, wherein the email application includes a schedule sharing menu, detect a user input that selects the schedule sharing menu, in response to detecting the user input, display a schedule sharing input region, receive the schedule information corresponding to prompts within the schedule sharing input region, store the schedule information in a schedule management application and the transfer protocol header, and transmit an email comprising the transfer protocol header to a second electronic device.

15. The first electronic device of claim 14, wherein the processor is configured to store identification (ID) information for identifying the schedule information, in the schedule management application.

16. The first electronic device of claim 15, wherein the processor is configured to store the ID information in the transfer protocol header associated with the schedule management application.

17. The first electronic device of claim 14, wherein the processor is configured to store the schedule information in an extension header of the transfer protocol header.

18. The first electronic device of claim 14, wherein the processor is configured to activate an extension header of the transfer protocol header while the user input is detected.

19. A second electronic device comprising:
a communication unit;
a display functionally coupled to the second electronic device; and
a processor coupled to the communication unit and the display, wherein the processor is configured to:
execute, at the second electronic device, an email application for transmitting and receiving emails that include schedule information in a transfer protocol header,
after receiving an email that includes the schedule information from a first electronic device, display the schedule information included in the email and a response menu,
detect a user input that selects the response menu,
in response to detecting the user input, display a schedule sharing response region,
receive response information corresponding to prompts within the schedule sharing response region,
store the response information in the transfer protocol header, and
transmit a response email comprising the transfer protocol header to the first electronic device.

20. The second electronic device of claim 19, wherein the processor is configured to:
parse information of the transfer protocol header of the email, and
display an icon corresponding to the email based on the parsed transfer protocol header information.

21. The second electronic device of claim 19, wherein the processor is configured to store Identification (ID) information of the email in the transfer protocol header.

22. The second electronic device of claim 19, wherein the response menu comprises an accept menu, a hold menu, and a reject menu.

23. The second electronic device of claim 22, wherein the response information comprises a flag indicating at least one of accept, hold, and reject of a schedule sharing request of the schedule information.

24. The second electronic device of claim 19, wherein the processor is configured to store the response information in an extension header of the transfer protocol header.

25. The second electronic device of claim 19, wherein the processor is configured to store the schedule information in a schedule management application according to the response email.

26. A first electronic device comprising:
a communication unit;
a display functionally coupled to the first electronic device; and
a processor, coupled to the communication unit and the display, wherein the processor is configured to:
execute, at the first electronic device, an email application for transmitting and receiving emails that include schedule information in a transfer protocol header,
receive a response email comprising the transfer protocol header from a second electronic device,
parse a flag indicating at least one of accept, hold, and reject of a schedule sharing request, and Identification (ID) information in the transfer protocol header, and
update status information of a schedule management application based on the parsed flag and ID information.

* * * * *